United States Patent [19]

Shebanow

[11] Patent Number: 5,738,565
[45] Date of Patent: Apr. 14, 1998

[54] DEVICE FOR CLEANING COMPUTER HEADS

[76] Inventor: Michael S. Shebanow, 4414 E. Calle Del Conde, Tucson, Ariz. 85718

[21] Appl. No.: 644,356

[22] Filed: May 10, 1996

[51] Int. Cl.⁶ .................................................. B24B 1/00
[52] U.S. Cl. ..................................... 451/28; 360/128
[58] Field of Search ............................. 451/549, 550, 451/59, 60, 28; 360/133, 128

[56] References Cited

U.S. PATENT DOCUMENTS

| | | | |
|---|---|---|---|
| 4,065,798 | 12/1977 | Sugisaki et al. | 360/128 |
| 4,622,617 | 11/1986 | Fritsch | 360/128 |
| 4,751,797 | 6/1988 | Fujimori | 51/395 |
| 4,916,564 | 4/1990 | Fritsch | 360/128 |
| 5,075,919 | 12/1991 | Rogers et al. | 15/210 R |
| 5,119,256 | 6/1992 | NakaMats | 360/128 |

FOREIGN PATENT DOCUMENTS

| | | | |
|---|---|---|---|
| 0184617 | 8/1987 | Japan | 360/128 A |
| 6290426 | 10/1994 | Japan | 360/128 |
| 2278710 | 12/1994 | United Kingdom | 360/128 A |

*Primary Examiner*—Robert A. Rose
*Attorney, Agent, or Firm*—Antonio R. Durando

[57] ABSTRACT

A cleaning device for the heads of a Personal Computer is in the form of a diskette insertable in a disk drive of the computer. The diskette is provided with a pair of superimposed abrasive disks each of which rubs against one head of the computer when the diskette is in the disk drive and the latter is activated.

15 Claims, 2 Drawing Sheets

DEVICE FOR CLEANING COMPUTER HEADS

BACKGROUND OF THE INVENTION

1. Field of the Invention

The invention relates to a device for cleaning heads which read from or record information on magnetic storage media.

2. Description of the Prior Art

Personal Computers or PCs are provided with flexible disk drives with heads which are able to record information on or read information from magnetic storage media. This makes it possible to permanently store back-up information, and to load or recover information into or from the PC.

The storage media are commonly in the form of flexible disks known as diskettes or floppy disks. These flexible disks are extensively used to distribute prerecorded software programs. Such a storage diskette consists of a plastic shell which encloses a magnetic coated disk. The storage diskettes come in various sizes, and PCs are provided with special disk drives which receive the storage diskettes for recording and reading. The most widely used format today is the 3.5-inch microfloppy disk, which is described below in the context of the preferred embodiment of the invention.

During recording as well as reading, friction exists between a drive head and a storage disk. This leads to the production of wear particles which accumulate on the head together with other types of particles. Eventually, the particles create a barrier spacing which reduces the amplitude and integrity of signals during the process of recording and, especially, of reading information. This condition may require replacement of the drive.

To allow the heads of a drive to read and record reliably over extended periods of time, it has become the practice to clean the heads periodically. This is accomplished using a cleaning diskette in which the magnetic disk is replaced by a cleaning disk made of a porous fabric. The cleaning disk is wetted with a special cleaning solution and the cleaning diskette inserted in the appropriate disk drive. The disk drive is then activated for some interval, generally about 30 seconds, to clean the heads. Following the cleaning operation, the cleaning diskette is removed.

This cleaning procedure has drawbacks. To begin with, the procedure is somewhat inconvenient inasmuch as it is necessary to wet the cleaning disk. Adequate precautions must be exercised to prevent spilling of the cleaning solution and excessive wetting of the cleaning disk, which would produce signal degradation by forming a film spacing.

Furthermore, environmental concerns prevent the use of more effective solvents in the cleaning solution. Consequently, the efficiency of the cleaning solution is relatively low. Moreover, the heads of PCs are made from porous materials and particles deposit in the pores as well as on the surfaces of the heads. Due to molecular attraction, very strong bonds are established between the surface particles and those in the pores. The cleaning solution is ineffective against these bonds since the bonds are highly resistant to solvents.

The dominant cleaning action in the wet cleaning procedure described above results from wiping of the heads with the fabric cleaning disk. However, this removes only a very small portion of loose particles.

SUMMARY OF THE INVENTION

It is an object of the invention to provide a cleaning device which allows a head to be cleaned more easily.

Another object of the invention is to provide a cleaning device which enables a head to be cleaned more effectively.

An additional object of the invention is to provide a method of making a cleaning device capable of cleaning a head more easily.

A further object of the invention is to provide a method of making a cleaning device having the ability to clean a head more effectively.

It is also an object of the invention to provide a cleaning method which permits a head to be cleaned more easily.

Yet another object of the invention is to provide a cleaning method which makes it possible to clean a head more effectively.

The preceding objects, as well as others which will become apparent as the description proceeds, are achieved by the invention.

One aspect of the invention resides in a cleaning device for a head of an apparatus, e.g., a Personal Computer, having a disk drive for an information storage medium which is readable by or recordable on by the head when engaged by the disk drive. The device comprises an abrasive assembly engageable by the disk drive so as to permit abrasion of foreign matter from the head.

In accordance with the invention, foreign matter is removed from a head by abrasion. Since this can be accomplished without a wetting agent, cleaning of the head can be performed with relative ease. Furthermore, inasmuch as abrasive action is capable of efficiently breaking the bonds which bind foreign matter to the head, relatively effective cleaning of the head can be achieved.

Another aspect of the invention resides in a method of making a cleaning device for a head of an apparatus having a disk drive for an information storage medium which is readable by or recordable on by the head when engaged by the disk drive. The method comprises the steps of providing an abrasive unit, and providing carrier means for the abrasive unit engageable by the disk drive. The method further comprises the step of combining the abrasive unit and the carrier means to form an abrasive assembly which is engageable by the disk drive so as to permit abrasion of foreign matter from the head.

The combining step may include jacketing the abrasive unit. The combining step can also involve mounting the abrasive unit on the carrier means for rotation relative to at least part of the carrier means.

The step of providing the abrasive unit can comprise juxtaposing a pair of abrasive members having respective abrasive surfaces so that such surfaces face away from one another. The step of providing the abrasive unit can additionally comprise fixing the abrasive members relative to each other so that the abrasive members are spaced from one another. Fixing of the abrasive members can involve adhesively bonding the abrasive members to each other.

Still another aspect of the invention resides in a method of cleaning a head which reads from or records on an information storage medium. This method comprises the step of abrasively removing foreign matter from the head.

The removing step can be performed by moving an abrasive over the head. The removing step is preferably carried out substantially dry.

Additional features and advantages of the invention will be forthcoming from the following detailed description of preferred embodiments when read in conjunction with the accompanying drawings.

DESCRIPTION OF THE PREFERRED EMBODIMENTS

Figure 1:
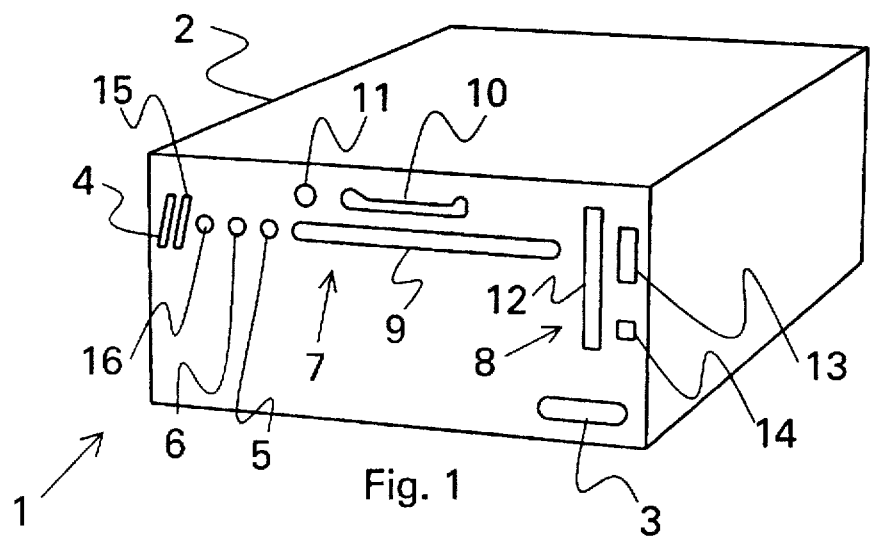
FIG. 1 schematically illustrates a Personal Computer having a pair of flexible disk drives for diskettes which are readable by and recordable on by heads constituting part of the disk drive.

Referring to FIG. 1, the numeral 1 generally identifies a conventional Personal Computer or PC having a case or housing 2. The computer 1 is equipped with an on/off button 3, a reset button 4, an indicator light 5 which is illuminated when the power to the computer 1 is on, and an indicator light 6 which is illuminated when the hard disk drive of the computer 1 is operating. The computer 1 further comprises a disk drive or holder 7 for diskettes of a first size and a disk drive or holder 8 for diskettes of a smaller second size. The disk drive 7 is here an 'A' drive for 5.25-inch diskettes while the disk drive 8 is a 'B' drive for 3.5-inch diskettes. The 'A' drive 7 encompasses a slot 9 in the case 2 for insertion of a 5.25-inch diskette in the computer 1, a door 10 for locking the diskette in the computer 1, and an indicator light 11 which is illuminated when the 'A' drive is operating. Similarly, the 'B' drive 8 comprises a slot 12 in the case 2 for insertion of a 3.5-inch diskette in the computer 1, a release button 13 for ejecting the diskette from the computer 1, and an indicator light 14 which is illuminated when the 'B' drive is operating.

The illustrated model of the computer 1 is additionally provided with a turbo button 15, and an indicator light 16 which is illuminated when the computer 1 is in the turbo mode.

The 'A' and 'B' drives 7,8 can be used to read information from, as well as to write or record information on, diskettes of the type having a magnetized disk encased in a shell. Heads located inside the case 2 function to read information from such storage diskettes or information storage media when these are engaged by the 'A' and 'B' drives. The heads also serve to write or record information on storage diskettes or information storage media engaged by the 'A' and 'B' drives.

The computer 1 represents one example of an apparatus having a disk drive for an information storage medium, and one or more heads for reading information from or recording information on an information storage medium engaged by the disk drive.

Friction is created between the storage diskettes and the heads of the computer 1 during reading and writing. This causes wear particles to be produced. Over time, the wear particles accumulate on the heads together with other foreign particles. The accumulated particles eventually form a spacing between the heads and the storage diskettes. Such spacing barrier reduces the amplitudes of the signals generated during reading, which affects the integrity of the signals. Consequently, the heads no longer read information reliably.

In an attempt to overcome this problem, it has become the practice to clean the heads periodically. Until now, this was accomplished using cleaning diskettes in which the magnetized disk present in a storage diskette is replaced by a cleaning disk of porous fabric. The cleaning diskettes come in different sizes corresponding to the 'A' and 'B' drives 7,8. To clean the heads, the cleaning disk of a cleaning diskette is wetted with a special solution and the cleaning diskette placed in the appropriate disk drive 7 or 8. The disk drive 7 or 8 is thereupon activated for a certain period, generally about 30 seconds, to subject the heads to a cleaning action. Upon completion of cleaning, the cleaning diskette is removed from the disk drive 7 or 8.

This cleaning procedure is somewhat inconvenient because of the wetting required. Care must be exercised to prevent spilling of the cleaning solution and excessive wetting of the cleaning disk.

Furthermore, due to environmental concerns, many highly effective solvents cannot be used in the cleaning solution. Hence, the efficiency of the cleaning solution is relatively low.

In addition, the heads of the computer 1 are porous and particles deposit in the pores as well as on the surfaces of the heads. As a result of molecular attraction, strong bonds are formed between the surface particles and those in the pores. These bonds cause the cleaning solution to be ineffective inasmuch as they are virtually unaffected by the cleaning solution.

The cleaning action of a conventional cleaning diskette arises solely from a wiping of the heads with the fabric cleaning disk. However, only loose particles are removed in this manner.

Figure 2:
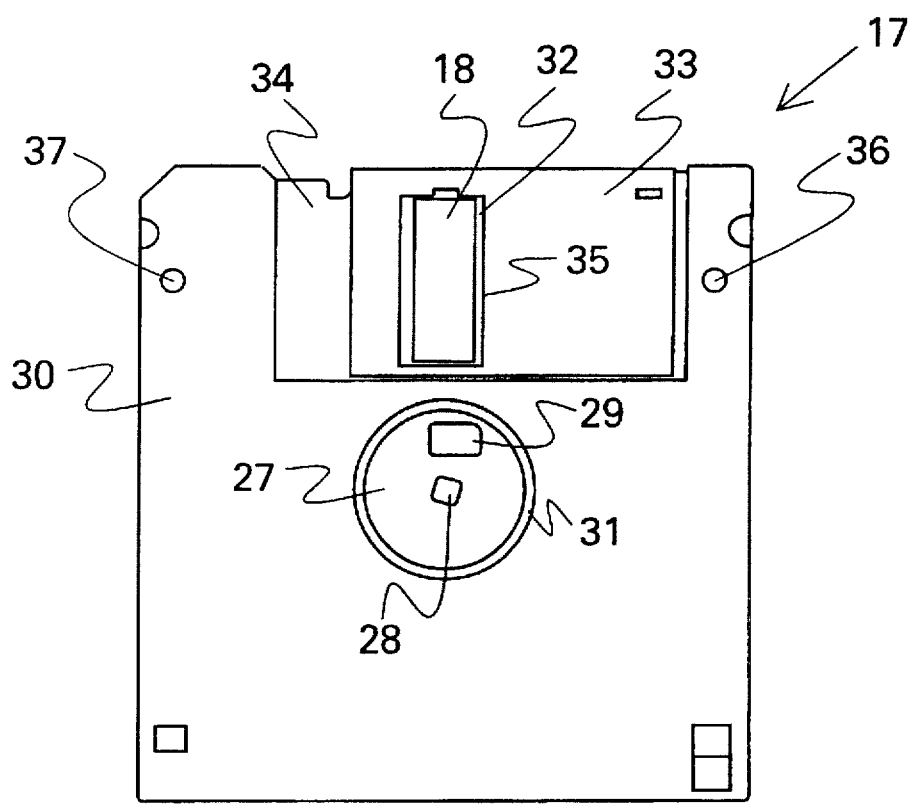
FIG. 2 is a bottom view of a diskette according to the invention which can be used to clean the heads in the disk drive of FIG. 1.

In accordance with the invention, these drawbacks are eliminated by a head cleaning device or assembly which is identified generally at 17 in FIG. 2. While the head cleaning device or assembly 17 is shown as having the configuration of a standard 3.5-inch diskette, the head cleaning device 17 can have any other suitable configuration.

Figure 3:
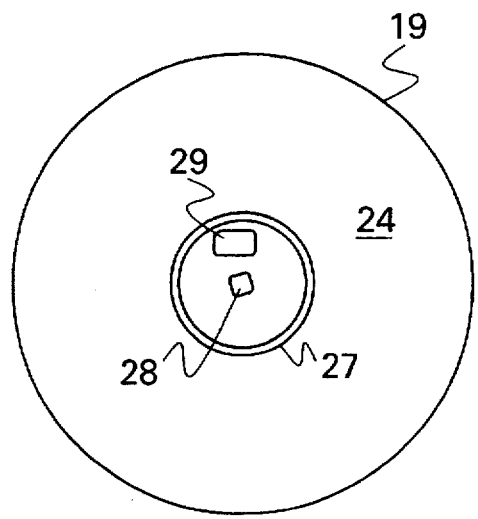
FIG. 3 is a bottom view of an abrasive unit forming part of the diskette of FIG. 2.
Figure 4:
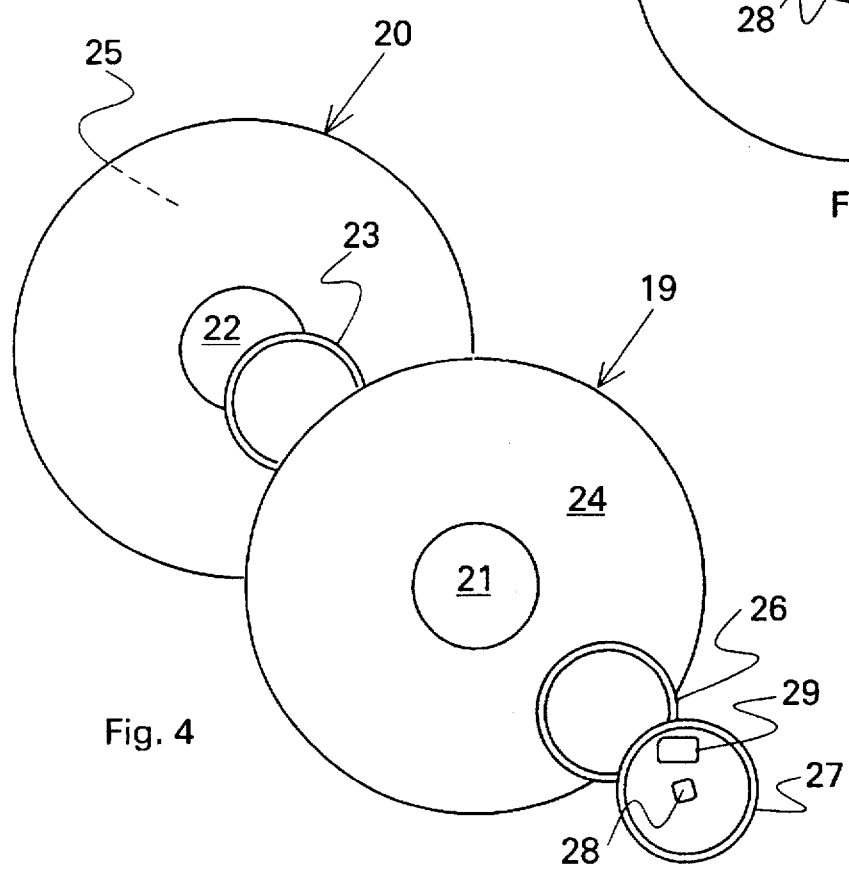
FIG. 4 is an exploded view of the abrasive unit of FIG. 3.

The head cleaning diskette 17 includes an annular abrasive unit 18 illustrated in detail in FIGS. 3 and 4. The abrasive unit 18 comprises two flexible, abrasive disks 19 and 20 which are provided with central openings 21 and 22, respectively. The central openings 21,22 are in register with each other. The abrasive unit 18 further comprises a ring 23 which is located between the abrasive disks 19,20 and serves to space the abrasive disks 19,20 from one another. The ring 23, which is preferably a double-sided adhesive ring, is centered with respect to the central openings 21,22.

The abrasive disk 19 has a major surface 24 which faces away from the ring 23 while the abrasive disk 20 has a major surface 25 which faces away from the ring 23. A ring 26 lies against the major surface 24 of the abrasive disk 19. A circular metallic hub 27 constituting part of a carrier means for the abrasive unit 18 is mounted on, and is spaced from the abrasive unit 18 by, the ring 26. The ring 26 and the hub 27 are centered with respect to the central openings 21,22. It is once again preferred for the ring 26 to be a double-sided adhesive ring.

The hub 27 is provided with two apertures 28 and 29 which are respectively engaged by a motor spindle and a spring-loaded drive pin in the motor assembly of the disk drive 8 of the computer 1. When the cleaning diskette 17 is inserted in the disk drive 8 and the latter is activated, the motor spindle and the drive pin rotate thereby setting the hub 27 in rotation. The rotary motion of the hub 27 is, in turn, transferred to the abrasive unit 18 by way of the ring 26.

Referring back to FIG. 2, the abrasive unit 18 is encased or jacketed in a flat plastic shell or jacket 30 also constituting part of the carrier means for the abrasive unit 18. The abrasive unit 18 is rotatable relative to the shell 30. In order to effect rotation of the abrasive unit 18, the shell 30 is provided with a central opening 31 which is in register with the hub 27 so as to permit engagement of the hub 27 by the motor spindle and drive pin of the disk drive 8.

The major surface 24 of the abrasive disk 19 faces one side of the shell 30 while the major surface 25 of the abrasive disk 20 faces the other side of the shell 30. Each side of the shell 30 is provided with a radial window 32 for accessing the adjacent major surface 24 or 25 of the respective abrasive disk 19 or 20. The windows 32, of which only one is visible, are disposed in exactly overlapping positions.

A normally closed, protective shutter 33 is slidably mounted in a recessed groove 34 of the shell 30 to cover the windows 32 when the cleaning diskette 17 is freestanding. Upon insertion of the cleaning diskette 17 in the disk drive 8, the shutter 33 is engaged by a mechanical arm and moved along the groove 34 to an open position so as to clear access to the windows 32 through conforming slots 35 in the shutter 33. The slots 35, of which only one is visible, are arranged in exactly overlapping positions. The shutter 33 is spring-loaded and automatically returns to its closed position when the shutter 33 is released from the mechanical arm by removing the cleaning diskette 17 from the disk drive 8.

The shell 30 is further provided with two alignment holes 36 and 37 that correspond to two alignment pins in the disk drive 8. The alignment holes 36,37, in cooperation with the alignment pins, function to initially align the cleaning diskette 17 with the motor spindle of the disk drive 8 when the cleaning diskette 17 is pushed into the disk drive 8.

The shell 30, which is entirely conventional, is sometimes referred to as a clamshell.

By way of example, the abrasive disks 19,20 can be made of polyethylene terephthalate (PET) sheet or film which is coated with abrasive particles dispersed in a high polymer binder. Sheets suitable for the abrasive disks 19,20 are produced by The 3M Company and are known as 252X, 262X, 425X, 452, and 453X Imperial Lapping Film. Depending on the specific film used, the sheets consist of 1 micron mineral particles of silicon carbide or aluminum oxide on a backing 2- to 3-mil thick. The ring 23 preferably consists of a 2-mil mylar substrate coated on each side with a 2-mil layer of adhesive.

One manner of making the cleaning diskette 17 is as follows:

One or more abrasive sheets or films are subjected to a punching operation to form the abrasive disks 19,20. The spacer ring 23 is bonded to a major surface of one of the abrasive disks 19,20, and a major surface of the other abrasive disk 19,20 is then bonded to the spacer ring 23. The spacer ring 26 is now bonded to the major surface 24 of the abrasive disk 19, that is, the major surface of the abrasive disk 19 which faces away from the spacer ring 23. The hub 27 is thereupon bonded to the spacer ring 26.

The assembly of abrasive disks 19,20, spacer rings 23,26 and hub 27 is encased in the plastic shell 30. This can be accomplished by molding. Subsequently, the shutter 33 and the spring urging the latter to the closed position are mounted on the shell 30.

Figure 5:
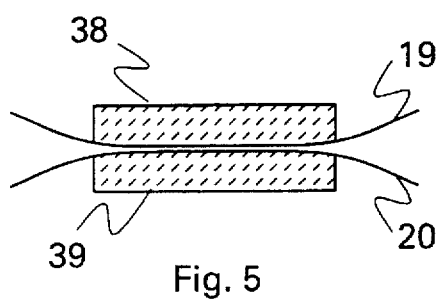
FIG. 5 schematically illustrates the diskette of FIG. 2 in the process of cleaning the heads in the disk drive of FIG. 1.

With reference to FIG. 5, two heads 38 and 39 are associated with the disk drive 8 of the computer 1. When an information storage diskette is inserted in the disk drive 8, one of the heads 38,39 is located on either side of the storage diskette. The heads 38,39 read from and write on opposite sides of the magnetic disk of the storage diskette.

To clean the heads 38,39, the cleaning diskette 17 is inserted in the disk drive 8. As shown in FIG. 5, the cleaning diskette 17 is disposed between the heads 38,39 with the abrasive disk 19 adjacent the head 38 and the abrasive disk 20 adjacent the head 39. After the cleaning diskette 17 has been placed in the disk drive 8, the disk drive 8 is activated. This causes the abrasive disks 19,20 to rotate so that the abrasive disks 19,20 abrade foreign matter from the heads 38,39. Due to the spacing between the abrasive disks 19,20, the head 38 is cleaned independently of the head 39. No wetting agent is required for the cleaning diskette 17 and the cleaning operation is preferably performed dry. When the disk drive 8 has operated for a certain interval, the cleaning diskette 17 is removed from the disk drive 8.

The cleaning diskette 17 is convenient to use. It is merely necessary to insert the cleaning diskette 17 in, and to activate, the disk drive 8. No special measures are required for insertion of the cleaning diskette 17 in the disk drive 8 and the cleaning diskette 17 is inserted in the disk drive 8 in the same manner as an ordinary information storage diskette. Furthermore, the cleaning diskette 17 need not be wetted thereby making it possible to eliminate environmental concerns as well as concerns about spilling or applying too much cleaning solution.

The cleaning diskette 17 is also highly effective. Unlike conventional cleaning diskettes which rely on a solvent to destroy the bonds holding foreign matter on a head, the cleaning diskette 17 employs a positive mechanical action for bond destruction. Experiments have demonstrated that a head cleaned by the cleaning diskette 17 is comparable to a new head.

The recommended practice for conventional wet cleaning diskettes is that these be used a maximum of 15 times. In contrast, the cleaning diskette 17 is usable for several hundred cleaning operations.

The invention is not restricted to computers and is generally applicable to apparatus of the type having a disk drive for an information storage medium, and one or more heads for reading information from or recording information on an information storage medium engaged by the disk drive.

Various modifications are possible within the meaning and range of equivalence of the appended claims.

I claim:

1. A device for cleaning a head of an apparatus having a holder for an information storage medium which is readable by or recordable on by the head when engaged by the holder, said device comprising an abrasive assembly engageable by the holder so as to permit abrasion of foreign matter from the head, said assembly including a pair of abrasive members having opposite major surfaces with external peripheries and means located centrally of said abrasive members for spacing said abrasive members to form an air gap extending inwardly from said external peripheries to said spacing means between said surfaces.

2. The device of claim 1, wherein said assembly comprises carrier means for said members.

3. The device of claim 2, wherein said carrier means comprises a jacket for said members, said jacket having a window for exposing at least one of said members to the head.

4. The device of claim 3, further comprising a shutter for said window, said shutter being movable between a first position in which said window is covered and a second position in which said window is uncovered.

5. The device of claim 2, wherein said carrier means rotatably supports said members.

6. The device of claim 1, wherein at least one of said members comprises an abrasive disk.

7. The device of claim 1, wherein said members are juxtaposed and have respective abrasive surfaces which face away from one another.

8. A device for cleaning a head of an apparatus having a holder for an information storage medium which is readable by or recordable on by the head when engaged by the holder, said device comprising an abrasive assembly engageable by the holder so as to permit abrasion of foreign matter from the head, said assembly including a pair of juxtaposed abrasive members having respective abrasive surfaces which face away from one another, and said members being spaced from each other, said assembly further including a first spacer between said members, a second spacer to one side of said members, and a carrier element mounting said members for rotation, said second spacer being located between said carrier element and said members.

9. The device of claim 8, wherein each of said members comprises a disk and each of said spacers comprises a ring.

10. The device of claim 8, wherein said spacers are adhesive.

11. A method of making a device for cleaning a head of an apparatus having a holder for an information storage medium which is readable by or recordable on by the head when engaged by the holder, said method comprising the steps of:

providing a pair of abrasive members having opposite major surfaces with external peripheries and means located centrally of said abrasive members for spacing said abrasive members to form an air gap extending inwardly from said external peripheries to said spacing means between said members;

providing carrier means for said members engageable by the holder; and assembling said members and said carrier means to form an abrasive assembly which is engageable by the holder so as to permit abrasion of foreign matter from the head.

12. The method of claim 11, wherein the assembling step comprises jacketing said members.

13. The method of claim 11, wherein the assembling step comprises mounting said members on said carrier means for rotation relative to at least part of said carrier means.

14. The method of claim 11, wherein said members have respective abrasive surfaces and the assembling step comprises juxtaposing said abrasive members so that said abrasive surfaces face away from one another.

15. The method of claim 11, wherein the assembling step comprises adhesively bonding said members to one another.

* * * * *